United States Patent [19]
Herkenberg

[11] Patent Number: 5,451,325
[45] Date of Patent: Sep. 19, 1995

[54] METHOD FOR THE REMOVAL OF OIL FROM OIL SPILLS

[76] Inventor: Wolf Herkenberg, 37 Morning Dew Road, West Hill, Ontario, M1E 3X2, Canada

[21] Appl. No.: 274,504

[22] Filed: Jul. 13, 1994

Related U.S. Application Data

[63] Continuation-in-part of Ser. No. 859,808, Mar. 30, 1992, abandoned, which is a continuation-in-part of Ser. No. 446,761, Dec. 6, 1989, abandoned.

[51] Int. Cl.⁶ .................................. E02B 15/04
[52] U.S. Cl. .................. 210/693; 210/747; 210/242.4; 210/924; 210/925; 134/6; 134/9; 134/42
[58] Field of Search ............... 210/799, 690, 694, 691, 210/692, 693, 242.4, 242.3, 922, 923, 924, 925, 282, 747, 170; 405/62, 68, 69; 134/6, 9, 42; 428/137, 134, 136, 131, 152, 166, 178, 198, 516, 138; 435/188

[56] References Cited

U.S. PATENT DOCUMENTS

| | | | |
|---|---|---|---|
| 3,146,192 | 8/1964 | McClintock | 210/693 |
| 3,231,454 | 1/1966 | Williams | 161/110 |
| 3,265,616 | 8/1966 | Wyllie et al. | 210/693 |
| 3,491,023 | 1/1970 | McCormick | 210/242.3 |
| 3,536,616 | 10/1970 | Kondoh et al. | 210/693 |
| 3,607,791 | 9/1971 | Shell | 210/693 |
| 3,667,235 | 6/1972 | Preus | 210/242.3 |
| 3,679,058 | 7/1972 | Smith | 210/242.4 |
| 3,739,913 | 6/1973 | Bogosian | 210/242.4 |
| 3,744,638 | 7/1973 | Rhodes | 210/242.4 |
| 3,764,527 | 10/1973 | Sohl | 210/693 |
| 3,791,927 | 2/1974 | Forgione et al. | 195/68 |
| 3,843,517 | 10/1974 | McKinney et al. | 210/922 |

(List continued on next page.)

FOREIGN PATENT DOCUMENTS

| | | |
|---|---|---|
| 1000915 | 12/1976 | Canada . |
| 1534725 | 6/1968 | France . |
| 2359937 | 2/1978 | France . |
| 2339541 | 2/1975 | Germany . |
| 2822174 | 11/1979 | Germany . |
| 50-46582 | 4/1975 | Japan . |
| 0129172 | 11/1978 | Japan . |

OTHER PUBLICATIONS

"The Basics of Oil Spill Cleanup with Particular Reference to Southern Canada", published 1979 by Environmental Emergency Br. Environmental Protection Serv., Environmental Canada, pp. 72–90.

"A Field Guide to Coastal Oil Spill Control and Cleanup Techniques", rpt. No. 9/81 prepared by Concawe's Oil Spill Cleanup Technology Special Task Force No. 1, pp. 1, 92–93. (Sep. 1981).

"Selection Criteria and Laboratory Evaluation of Oil Spills Sorbents Update III", rpt. EPS 3/SP/1 of Envi-

(List continued on next page.)

*Primary Examiner*—Cynthia L. Nessler
*Attorney, Agent, or Firm*—Ridout & Maybee

[57] ABSTRACT

Relatively thin flexible sheets of oleophilic, hydrophobic substrates, such as polyethylene film, are used as the basis for sorbent media in novel methods for defending against oil spills. Exhibiting the combination of a high storage density and a high affinity for oil, substrates according to the invention are intended for deployment on sensitive areas of open water or shoreline as a first line of defence against approaching oil slicks, or for early assistance in the containment of oil near the source of a spill. Efficiency and economy in specific applications is achieved on the principle that oil pick-up per unit mass of film-form substrates is increased by decreasing the substrate thickness. The substrate is deployed from a compact supply, in a pre-deployment condition of high storage density onto the area to be protected, in the course of which it is converted to a post-deployment, in-use condition of bulk capacity for oil. One or more layers of a sorbent material may be extended onto the oil-contaminated surface of an expanse of open water or may be extended onto a shoreline water or land area to be protected from approaching oil spills. Sorbent media used in carrying out the method of the invention may advantageously incorporate oil-degrading additives.

14 Claims, 6 Drawing Sheets

U.S. PATENT DOCUMENTS

| | | | |
|---|---|---|---|
| 3,870,599 | 3/1975 | Azarowicz | 210/925 |
| 3,871,957 | 3/1975 | Mohan et al. | 210/11 |
| 3,988,932 | 11/1976 | Baier et al. | 210/925 |
| 4,028,750 | 6/1977 | Gustafsson | 4/172.12 |
| 4,031,839 | 6/1977 | Pedone | 210/924 |
| 4,049,554 | 9/1977 | Ayers | 210/242.3 |
| 4,052,306 | 10/1977 | Schwartz et al. | 210/DIG. 5 |
| 4,055,180 | 10/1977 | Karami | 128/287 |
| 4,107,051 | 8/1978 | Lorentzen | 428/109 |
| 4,111,813 | 9/1978 | Preus | 210/282 |
| 4,133,088 | 1/1979 | Hikobe et al. | 210/924 |
| 4,137,575 | 2/1979 | Kaffke | 4/172.12 |
| 4,237,012 | 12/1980 | Faure | 210/242.3 |
| 4,276,179 | 6/1981 | Soehngen | 210/679 |
| 4,293,348 | 10/1981 | Shewmaker | 210/925 |
| 4,316,804 | 2/1982 | Bocard et al. | 210/924 |
| 4,332,854 | 6/1982 | Parker | 210/282 |
| 4,340,486 | 7/1982 | Swanson | 210/693 |
| 4,395,336 | 7/1983 | Eng | 210/693 |
| 4,464,468 | 8/1984 | Avrameas et al. | 435/177 |
| 4,480,800 | 11/1984 | Oberg et al. | 242/55 |
| 4,483,716 | 11/1984 | Heller | 210/925 |
| 4,497,712 | 2/1985 | Cowling | 210/691 |
| 4,692,059 | 9/1987 | Juutilainen | 405/63 |
| 4,729,834 | 3/1988 | Itoh | 210/670 |
| 4,737,394 | 4/1988 | Zafiroglu | 428/102 |
| 4,810,385 | 3/1989 | Hater et al. | 210/606 |
| 4,840,734 | 6/1989 | Johnson | 210/660 |
| 4,935,152 | 6/1990 | Gonzales | 210/747 |
| 5,039,414 | 8/1991 | Mueller et al. | 210/610 |
| 5,160,432 | 11/1992 | Gattuso | 210/242.3 |
| 5,181,802 | 1/1993 | Thengs et al. | 210/924 |
| 5,186,831 | 2/1993 | DePetris | 210/242.4 |
| 5,256,466 | 10/1993 | Berringan et al. | 428/166 |
| 5,342,525 | 8/1994 | Rowsell | 210/611 |
| 5,346,625 | 9/1994 | Webb | 210/925 |

OTHER PUBLICATIONS ronmental Protection Service of Environmental Canada, dated Jun. 1985.

Brochure entitled "Oil Sorbent Tehnical Information 3M".

Report entitled "Laboratory Evaluation of Sorbents Conducted for Conservation & Protection Pacific Region Environment Canada" (L. B. Solsberg) dated Mar. 1988.

1987 "World Catalogue of Oil Spill Response Products" (Robert Schulze) pp. 387 to 393.

METHOD FOR THE REMOVAL OF OIL FROM OIL SPILLS

RELATED APPLICATIONS

This application is a continuation-in-part of Ser. No. 07/859,808 filed Mar. 30, 1992, and entitled "Method and Apparatus For The Removal of Oil From Oil Spills", now abandoned, which in turn was a continuation-in-part of Ser. No. 07/446,761, filed Dec. 6, 1989, and entitled "Thin Flexible Sheet Sorbent Material For the Removal of Oil From Oil Spills", now abandoned.

BACKGROUND OF THE INVENTION

Areas of open and inland waters and shorelines are with increasing frequency being polluted by the spillage of oil. One major approach to alleviating this problem has been the development of apparatus and methods for preventing the spreading of spilled oil by confining it to the area near its discharge. This facilitates removal, by causing the oil to concentrate in thicker layers on the surface of the water. Containment of spilled oil employs commercially available floating booms such as exemplified in the oil collection boom of U.S. Pat. No. 3,679,058 (Smith) or sorbent barriers such as that described in U.S. Pat. No. 3,739,913 (Bogosian).

Such containment techniques are not fully effective, as water currents, waves and wind conditions often lead to the escape from the containment region of oil which forms an outwardly spreading film that diminishes from a few millimeters down to fractions of a micron (0.001 mm) in thickness as it moves towards the shoreline, where it can present a serious ecological threat to sensitive areas, such as fish-hatcheries, wildlife preserves, harbours and beaches.

A number of sorbent materials have been proposed or made commercially available for the purpose of picking up oil which has escaped from containment booms and for protecting shorelines. These range from natural products, such as straw or sawdust, to synthetics such as polypropylene or polyurethane foam, or relatively thick (5 mm or greater) mats, sheets or rolls of melt-spun and fabric-stitched oleophilic polymers. Examples of the latter include 3M TM Type 156 pads and ALSORB TM sheets or rolls.

Fibrous synthetic sorbent sheets of the kind presently in use have high sorption capacities, but tend to be considerably more expensive than natural or inorganic products. Their utilization has been restricted to smaller spills in sheltered waters or to recover oil whose access by skimmers or other mechanical means is difficult, such as under docks, etc. They can as well be of value for use and re-use to pick up oil within containment areas, where the high thickness of oil enables economical use of their full capacity. Re-useability of such materials, by squeezing oil from the porous interior, is stated to be a major advantage. As a practical matter, however, reusability may be an economic necessity because of the price of such materials. Further, reusability requires apparatus, facilities and man-hours for extracting and collecting the oil from the used sorbent. Moreover, the re-use of sorbents may be prohibited by regulation in some jurisdictions, to the extent that it presents a risk of re-contamination.

Known oil sorbent materials have not adequately met the need for a relatively inexpensive sorbent which exhibits a high pick-up ratio for oil, which can be conveniently stored in quantity in a relatively small space, and which can be readily and rapidly deployed from a compact unit onto sensitive areas to protect them against approaching oil slicks.

The minimum thickness of conventional synthetic sorbent materials in the form of sheets or rolls of non-woven polymer fibres is around 5 mm, which imposes a limit on the quantity of such bulky sorbent which can be stored in a given space. As discussed in greater detail below, it is desirable that there be available for use considerably thinner sorbent materials which nevertheless exhibit an adequate affinity for oil, to make it practical to keep substantial amounts of sorbent in storage at the ready for use in the event of an emergency, and that the deployment of such materials require no complex apparatus or technique calling for special training or skill.

A principal desirable property not exhibited by presently available sorbents is the combination of a high product density (for easier storage and handling) with a sufficiently high pick-up ratio. By "pick-up ratio" is meant the mass of oil which adheres to a given dry mass of sorbent, in use, symbolized hereinafter as $m_O/m_S$. By "product density", is meant the mass of dry sorbent contained in a unit volume of the product, as stored in preparation for use, symbolized hereinafter as $m_S/V_S$. The product of these two quantities, $m_O/V_S$, is a useful measure of the practical efficiency of a sorbent product, being the amount of oil which can be picked up by a given volume of sorbent, and is hereinafter referred to as the "pick-up density".

Particularly on application to very thin water-borne oil films, sorbents in the form of mats or pads of synthetic fibre are subject to varying degrees of undesirable water pick-up as a portion of these thicker materials rides below the oil surface and in the water.

I have discovered that relatively thin flexible sheets of oleophilic, hydrophobic substrates, such as polyethylene film, may be used as the basis for sorbent media that are effective and commercially advantageous in protecting shoreline water or land areas from approaching oil spills, particularly for deployment on sensitive areas as a first line of defense against approaching oil slicks, but also, in particular embodiments of the method of my invention, for early assistance by delaying the spreading of oil on water on or on land by deployment near the source of an oil spill or leak. Such sorbent media are sufficiently inexpensive that disposal of the oil-charged medium after use and removal, as by incineration, is economically more practical than in the case of the more expensive synthetic sorbent media currently available. However, the sorbent media disclosed herein for use according to the invention may alternatively be re-used following extraction of absorbed and adsorbed oil. Too, having no fibrous structure and being made of thin buoyant material, such sorbent media are inherently free of water pick-up.

The underlying principle of the novel sorbent media used in my invention is that an oleophilic, hydrophobic film such as thin polyethylene film preferentially adsorbs oil which covers the surface of the film by a process of planar migration of oil across the two principal surfaces of the film. The degree of sorption of the oil on an oleophilic surface is a function of the surface area and configuration of such media. Use of the thinnest substrate permitting sufficient mechanical strength in use results in the maximized value of $m_O/m_S$.

In this respect, the sorbent media used in my invention differ fundamentally from the fibrous web-type sorbents which, in many applications, have a substantial unused capacity for oil, as discussed below.

A further fundamental difference arises from the thinness of my film-based sorbent media allowing them to be stored for use in a fan-folded, rolled-up or other configuration having a high product density, $m_s/V_s$, so that the capacity for oil per unit volume of the sorbent as stored is advantageously large.

A helpful way of viewing the methods of my invention, in which a thin flexible sheet sorbent material of the kinds discussed is deployed from a compact supply (in a pre-deployment condition of high storage density) onto the area to be protected is that the method transforms the sorbent from a pre-deployment condition of high density to a post-deployment, in-use condition of bulk capacity for oil.

According to one embodiment of the invention, the substrate used comprises a pair of oleophilic, hydrophobic films joined together along sealing seams defining a plurality of interior pockets, each film of the sorbent material having a plurality of small apertures therethrough to admit the migration of contaminating oil between the surfaces of the films and into the pockets. This sorbent has a dilatable configuration and a specific affinity for oil, so that the oil itself acts to expand the capacity within the sorbent for oil. When a length of sheet-form sorbent of this construction is unwound tangentially axially from a closely-wound storage roll and deployed flat onto the area to be protected, incoming oil migrates through the small apertures and along the internal oleophilic surfaces of the pockets, by planar migration, gradually filling the pockets and resulting in an enhanced degree of oil pick-up.

According to a second particular embodiment of the invention, the conversion of the substrate on a roll from its pre-deployment condition of high storage density to a deployed in-use condition of bulkiness and oil capacity is effected by playing the sorbent off the roll axially so that it forms a continuous, generally helical "belt" that affords a substantial barrier to an advancing oil spill.

By contrast, products such as the 3M TM absorbent pads have a deployment (in-use) volume which is essentially unchanged after sorption of oil from the pre-use (storage) volume of such materials, so that the pick-up density is limited. It is the object of the present invention to provide a method of using ultra-thin carriers having a maximal storage and pre-deployment density and minimum bulk in use which is close to that of the constituent oleophilic, hydrophobic material, allowing rapid deployment requiring no special skills and which, upon deployment, presents a contoured form having effective sorptive and barrier properties for oil.

SUMMARY OF THE INVENTION

With a view to overcoming the aforementioned disadvantages and achieving the aforementioned objects, the present invention provides a method for protecting shoreline water or land areas from approaching oil spills, comprising providing a supply of a thin flexible sheet sorbent material having a density less than water, which sorbent material comprises a thin, flexible, non-fibrous film of oleophilic hydrophobic material having two principal surfaces and being of a thickness selected to approximate the minimum necessary to impart sufficient mechanical strength to the sorbent material for use under prevailing conditions. The supply of sorbent material contains it in a pre-deployment condition of high product density. An effective length of the sorbent material is deployed from the supply onto the area to be protected and is removed, with oil retained thereby, for disposal after use.

According to a particular embodiment of the invention, the supply of sorbent material is in the form of a roll having closely wound thereabout a continuous length of the sorbent material, and the step of deploying the sorbent material comprises unrolling a desired length of the sorbent material from the roll in a tangential direction (i.e., tangentially to the circumference of the roll and perpendicularly to the axis thereof) and laying the length of sorbent material essentially flat onto the area to be protected.

According to a further embodiment of the invention, the supply of sorbent material is in the form of a roll having closely wound thereabout a continuous length of the sorbent material, and the step of deploying the sorbent material comprises pulling the sorbent material from the roll in an axial direction, i.e., parallel to the axis of the roll), whereby the sorbent material forms a generally helical belt. An effective length of the generally helical belt of sorbent material is extended between the area to be protected and the advancing oil spill.

The thin flexible sheet sorbent materials used in the methods of the invention advantageously comprise one or more thin, flexible, non-fibrous films of oleophilic, hydrophobic material each of which has a plurality of apertures therethrough to permit oil from the spill to pass from one principal surface of the film to the other. Where two such films make up the sorbent material, these may advantageously be sealed together, thereby forming a plurality of interior pockets for receiving contaminating oil.

BRIEF DESCRIPTION OF THE DRAWINGS

The invention and other objects and advantages thereof will be more fully understood with reference to the following drawings in which.

DETAILED DESCRIPTION OF THE INVENTION (a) Sorbent Materials For Use in Carrying Out Method of Invention There will first be disclosed several arrangements for film-based, sheet-like sorbent materials useful in carrying out the invention and experimental measurements of their measured essential properties, compared with a prior art sorbent, namely 3M Type 151 and Type 156 pads. These are, respectively, 3/16" (0.5 cm) and ⅜" (1 cm) thick fabric consisting of non-woven synthetic polyolefin fibres characterized by a high web void volume.

A small specimen (about 5 cm×6 cm) of each sorbent material tested, having a measured area equal to $A_s$ cm² was first weighed dry ($m_s$ grams) and was then (with the exception of specimen $S_0$) laid on one face on the surface of a bath of 10W40 motor oil (density=0.88 gm/cm³) and allowed to float on the oil until it was seen that the top surface of the specimen was completely covered by oil. Specimen $S_0$, being an unperforated integral film, total immersion in oil was required, as there are no through-film apertures for passage of oil between the principal surfaces for this particular specimen of film.

The specimen was then removed by one corner or end and allowed to hang until dripping stopped, then weighed to give the combined weight of oil pick-up plus sorbent weight, $(m_0+m_s)$ g. For each specimen, the following parameters were then calculated:

i) the aforementioned oil pick-up ratio $m_0/m_s$, which provides a dimensionless measure of the inherent affinity for oil of the sorbent tested;

ii) the ratio $A_s/m_s$ [cm²/g], the surface area presented by a unit mass of dry sorbent material;

iii) the ratio $m_0/A_s$ [g/cm²], the mass of oil taken up by unit area of dry sorbent material; and iv) the quantity $(m_0/A_s)/0.088$ [mm]. This quantity, referred to hereinafter as the "related oil thickness" characterizing the particular sorbent, is a measure of the maximum theoretical thickness of film of 10W40 oil (density=0.88 g/cm³) which can be fully taken up by a sorbent sheet exposed to the oil film.

v) the quantity $m_0/V_s$ [g/cm³], the pick-up density, is the mass of oil taken up by a given volume of sorbent material as packaged or as stored in readiness for use. Where, for example, the sorbent material is stored in a compact roll from which it is deployed for use in a selected length, the product density $m_s/V_s$ is simply the mass of sorbent in the roll divided by the volume occupied by the roll, and the pick-up density $m_0/V_s$ is obtained by multiplying the product density by the pick-up ratio of the sorbent, $m_0/V_s = (m_0/m_s) \times (m_s/V_s)$.

The experimental results are set out below in Table I, following which the various sorbent materials are identified and described. "S" refers to a sorbent material comprising a single film of material and "D" refers to a double-film sorbent material. Each data entry represents the average of three experimental measurements.

TABLE I

| Sorbent | (i) $m_0/m_S$ | (ii) $A_S/m_S$ | (iii) $m_0/A_S$ | (iv) $(m_0/A_S)/0.088$ | (v) $M_0/V_S$ |
|---|---|---|---|---|---|
| 3M Type 151 | 9.90 | 50.0 cm²/g | 0.196 g/cm² | .23 mm | 0.68 g/cm³ |
| 3M Type 156 | 8.10 | 26.0 | 0.312 | 3.54 | 0.56 |
| $S_0$ | 5.70 | 1,090 | $5.24 \times 10^{-3}$ | 0.059 | 4.73 |
| $S_1$ | 6.80 | 1,090 | $6.26 \times 10^{-3}$ | 0.071 | 5.10 |
| $S_2$ | 6.50 | 1,090 | $5.98 \times 10^{-3}$ | 0.067 | 5.20 |
| $S_3$ | 7.70 | 1,000 | $7.70 \times 10^{-3}$ | 0.087 | 5.39 |
| $D_1$ | 6.20 | 543 | $1.14 \times 10^{-2}$ | 0.129 | 5.70 |
| $D_2$ | 16.2 | 543 | $2.98 \times 10^{-2}$ | 0.338 | 12.96 |
| $D_3$ | 32.7 | 500 | $6.54 \times 10^{-2}$ | 0.743 | 21.25 |
| $D_4$ | 35.6 | 500 | $7.12 \times 10^{-2}$ | 0.809 | 23.14 |
| $D_5$ | 24.2 | 75.0 | 0.323 | 3.67 | — |
| $D_6$ | 16.4 | 147 | 0.094 | 1.068 | — |

$S_0$, $S_1$, $S_2$, and $S_3$ were specimens of flexible polyethylene film of a thickness of about 0.01 mm (10 microns) and a density of about 0.92 gm/cm³. $S_0$, unlike all other samples, was fully immersed in oil prior to effecting the experimental measurements, to provide a measure of the oil pick-up properties of polyethylene film not subjected to any deformation or breaks in its surface.

$S_1$ was made of the same material as $S_0$, but randomly pierced with a needle, with an average of about three pierces per cm² of sorbent surface. Sample $S_2$ also was provided with apertures through the film to permit the passage of oil, but in the form of 1 cm slits, with an average of four such slits per cm² of surface. Oil penetrating from the bottom of floated samples $S_1$ and $S_2$ was seen to spread over and fully cover the top surface of each specimen.

Comparison of the pick-up ratios of $S_1$ and $S_2$, 6.80 and 6.50 respectively, with the value of 5.70 for the "untreated" polyethylene film substrate in repeated experiments suggests that pierces and slits not only serve to allow the passage of oil from one major surface through to and across the other major surface, but also that additional oil collects at the puncture or slit discontinuities in the film.

The effect of surface texture irregularities in enhancing the degree of sorption of oil is illustrated by the still higher value of $m_0/m_s=7.70$ for $S_3$, a polyethylene film slit like $S_2$ but also formed with "creases" made by holding the specimen in a twisted configuration for 48 hours at a tension less than that sufficient to induce any appreciable cold flowing of the plastic.

Figure 1:
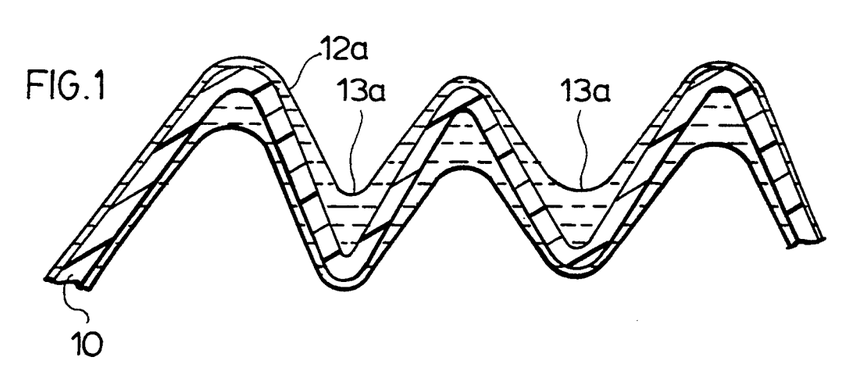
FIG. 1 is a schematic sectional view of a creased thin sorbent material having oleophilic and hydrophobic surfaces, illustrating the tendency of oil to collect at concave portions of the sorbent surface.
Figure 2:
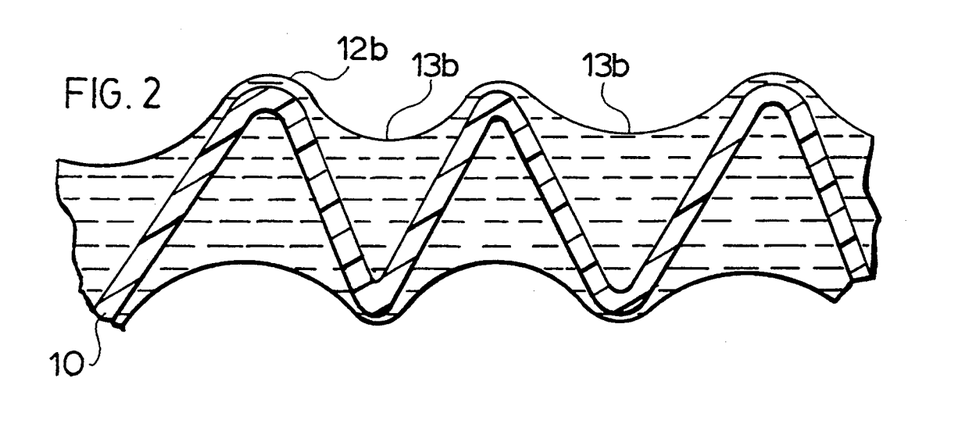
FIG. 2 is a schematic sectional view as in FIG. 1, illustrating the pattern of collection at concave surface portions for a higher viscosity oil than that illustrated in connection with FIG. 1.

FIGS. 1 and 2 represent the pooling of oil at the concave surfaces in cross-sectional schematic views of such a creased film. As shown in FIGS. 1 and 2, the oil becomes adhered to the film when the film is deployed onto the area to be protected and comes into contact with the oil. Also, in the deployed film, as shown in FIGS. 1 and 2, the aforementioned creases result in the deployed film being in a zigzag configuration. The inherent bulkiness associated with the creases and folds of the zigzag configuration allows the above mentioned pooling of the oil within the bulky zigzag configuration as is further described below. A portion of a creased film such as $S_3$ is indicated at 10 in FIGS. 1 and 2. For simplicity of representation, the apertures through film 10 are not shown. Indicated at 12a in FIG. 1 is the contour of a low-viscosity oil adsorbed to the surface of film 10. Indicated at 12b in FIG. 2 is the thickness pattern of a higher-viscosity oil adsorbed to the surface of film 10. "Bridging" zones of concave curvature where the adsorbed oil tends to collect in thicker pools are indicated at 13a in FIG. 1 and at 13b in FIG. 2. As noted above, the piercing of flat or creased films itself creates discontinuities. The annular concave surfaces around the pierced holes on one side of the film also act as bridging zones to augment the adherence of oil at such sites.

The practical advantages of a film-form substrate may be seen by comparing the entries in Table I for sorbent $S_3$ with those for 3M Type 151 and considering the use of either to deal with an oil slick of thickness one micron (0.001 mm). The "relative oil thickness" of the absorbent-pad 3M material is more than 2,000 times as great as the oil slick, while that of the $S_3$ is only about nine times as great. For a given area of sorbent material, the weight of 3M material is about 20 times that of $S_3$, so that the economic advantage of employing the film-form material is apparent.

3M Type 156 sorbent sheeting, which is twice as thick as Type 151, is available in standard rolls of 32" diameter and 36" width. Polyethylene film of the type used in specimens $S_0$ to $S_3$ is available in 10" diameter by 25" width standard rolls. By a geometric calculation it may be shown that one cubic meter of storage space will accommodate only about 90 $m^2$ of the 3M sorbent and about 72,000 $m^2$ of the film-form substrate, an increase in storage density and in compactness (for ease of handling) greater by a factor of about 800.

The pick-up density, $m_0/V_s$, is an important factor in the selection of a sorbent product for use in particular spill-combat applications, since it answers directly the question of how much oil a unit volume of sorbent product can be expected to pick up. This will be of importance to persons dispatching spill-control apparatus to an emergency site, since the storage space required to transport enough sorbent product to deal with the spill must be known. The pick-up density is also directly relevant to the ease and efficiency of physically handling the sorbent product at the deployment site.

A comparison of the entries in Table 1 for any of the sorbents according to the invention with those for the 3M Type 151 and 156 sorbents shows a ten-fold or more advantage in pick-up density. High storage and pick-up densities provide a clear advantage for the ready storage and deployment of the film-form sorbent. Thus, for example, a beachfront area could be provided with positioned roll dispensers to lay out one or more layers of sorbent according to method of the invention. With such a product, a 25" wide, 50 pound roll would cover approximately 25,000 square feet of area. Upon notice of an approaching oil slick, a small boat or rubber raft could participate in protecting a sensitive area by reeling off a sorbent of the type $S_3$ in front of the sensitive area, as a relatively inexpensive first line of defence.

A particular form of thin-flexible sheet sorbent material according to the invention and for use in the method and apparatus of the invention is exemplified by the "D" specimens referred to in Table I. Two or more flexible, oleophilic and hydrophobic films are joined together along portions of their facing principal surfaces to form separate pockets or domes, and suitable apertures are made through the films into the pockets to admit oil. The natural discontinuities along the perimeter of the apertures assist in maintaining a slight separation of the films.

Advantageously, the pockets or the constituent film may carry any of a number of known substances active in the degradation of oil, such as oil-decomposing bacterial cultures and enzymes or other substances which actively promote the degradation of oily contaminants by bacteria already present in the water, such as the biodegradation accelerating agent in INIPOL ™ EAP22, produced by Elf Aquitaine. The commercially available bioremediation product INIPOL EAP22 is an oleophilic nutrient for microorganims designed to treat hydrocarbon pollution by increasing the rate of natural biodegradation without the addition of exogenous bacteria. Owing to its oleophilic properties. INIPOL EAP22 supplies the missing nutrients at the water-hydrocarbon interface where the hydrocarbon degrading microorganisms live, thereby selectively increasing their development and producing a high rate of hydrocarbon degradation. Carrying out the method of the invention for collecting contaminating oil using sorbent media which incorporate agents that assist the degradation of hydrocarbons would avoid the necessity of spraying the affected area with oil-degrading compositions and introduces these materials to the affected area while simultaneously delaying the spreading of oil, in a one-stage process.

Specimens $D_1$ and $D_2$ were formed by layering two films of the same polyethylene as specimen $S_0$ together and heat sealing the films along perpendicular sealing seams, for example by heat-sealing, to form a rectangular matrix of 40×50 mm pockets. Double-film sorbent media useful in the invention could be made by different patterns of discontinuous sealing of one film to the other to form interior unsealed regions for the reception of and dilation by contaminating oil. In the case of $D_1$, several small slits were made on both sides of each such pocket, whereas in $D_2$, the only apertures into each pocket was a pair of offset circular near-central holes of diameter 3/16 through respective opposite surfaces of each pocket.

Figure 4:
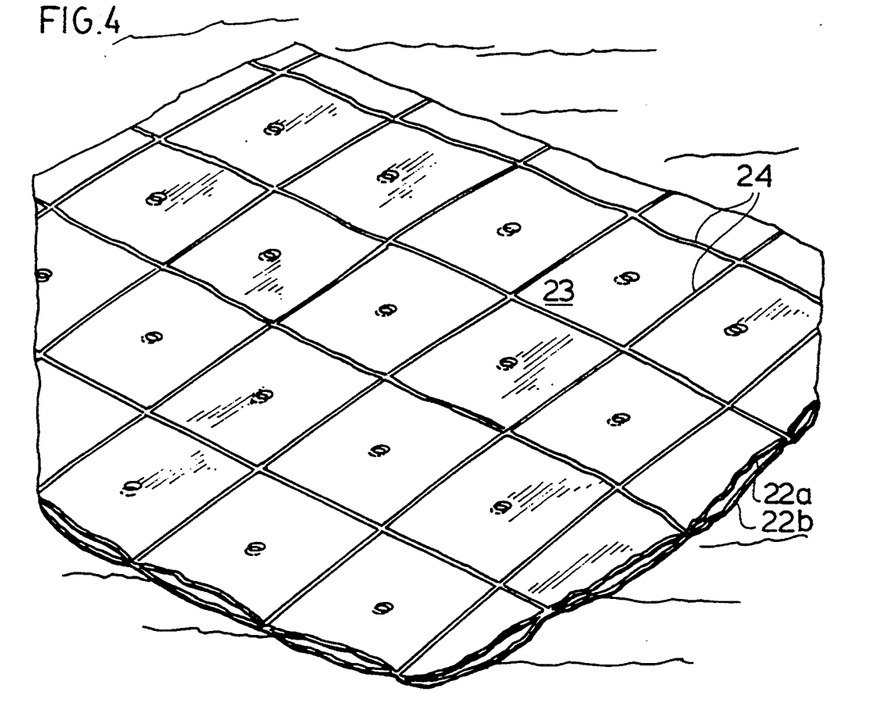
FIG. 4 is a perspective view of a portion of a sorbent material according to one embodiment of the invention.

Specimen $D_2$ is illustrated in FIGS. 4 to 8. FIG. 4 shows a perspective view of this sorbent material with the two polyethylene films 22a and 22b formed into a matrix of individual pockets such as 23 by sealing seams 24.

Figure 5:
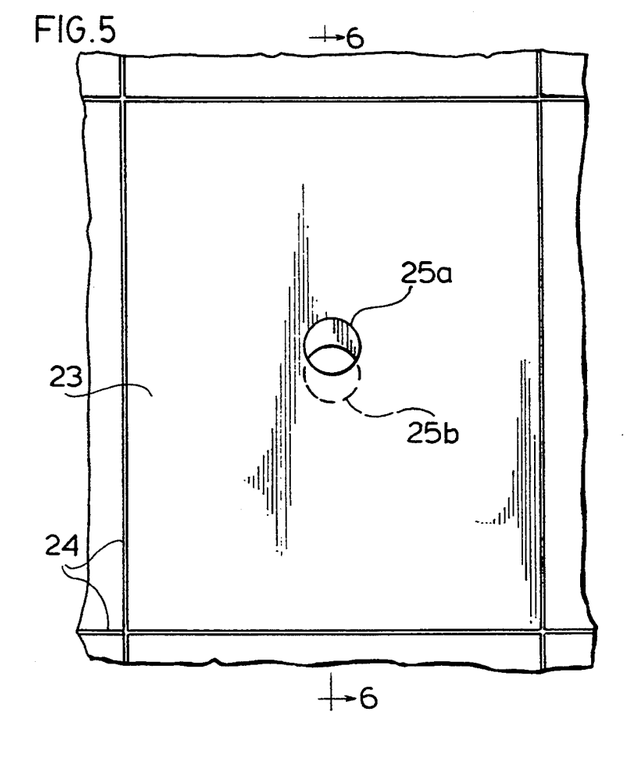
FIG. 5 is a plan view of one of the formed pockets in the sorbent material of FIG. 4.
Figure 6:
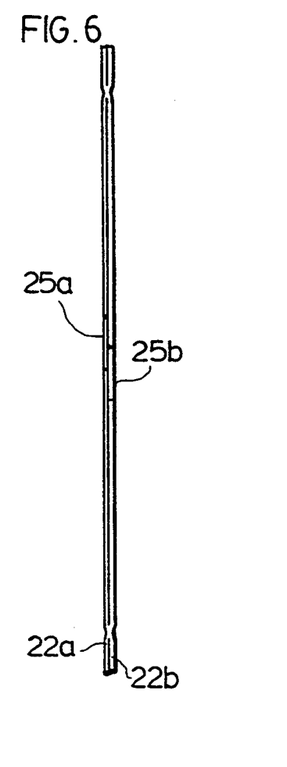
FIG. 6 is a sectional view along the line 6—6 of FIG. 5.
Figure 7:
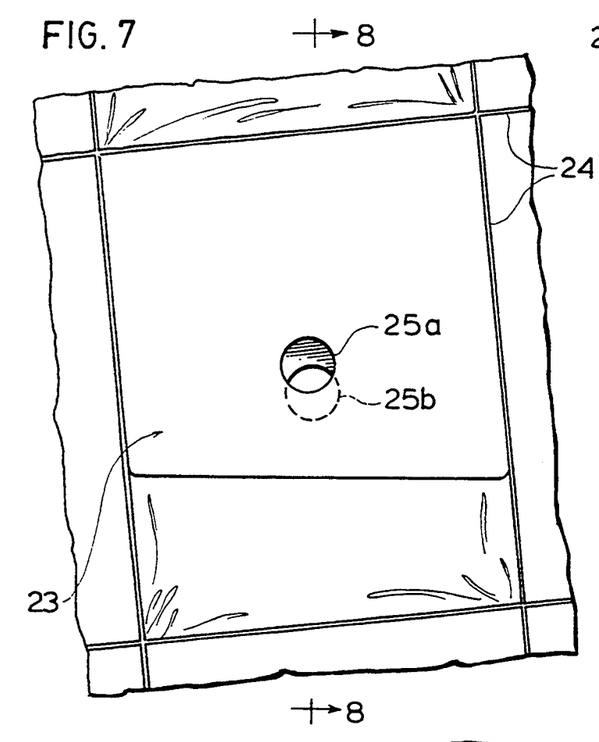
FIG. 7 is a schematic view of the pocket of sorbent material of FIG. 5 following entrapment of oil in the pocket.
Figure 8:
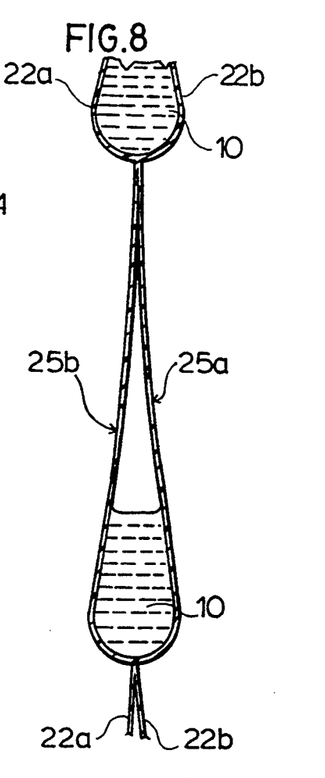
FIG. 8 is a sectional view along the line 8—8 of FIG. 7.

One such pocket of a $D_2$ specimen is illustrated prior to use in FIGS. 5 and 6 and after pick-up and retention of oil 10 in FIGS. 7 and 8.

As best seen in FIG. 5 and the cross-sectional view of FIG. 6, pocket 23 has two offset central holes 25a and 25b through respective upper and lower film surfaces 22a and 22b.

It was observed that the average value of the oil pick-up ratio $m_0/m_s$ for $D_2$ (16.2) was about three times as great as the corresponding slit specimen $D_1$ (6.20). From visual observation, it appears that when specimen $D_2$ is laid on the oil surface the immediate contact of oil with the exposed portion of the interior surface of the upper film 25a and the oleophilic interaction at that site facilitates the migration of oil along the interior film faces, where it is trapped in the pocket, as seen in FIG. 7 and the sectional view of FIG. 8. By having all pockets, centrally pierced, collected oil stays in the pockets below the aperture when the sorbent sheet is drawn from the treated area after use.

Figure 9:
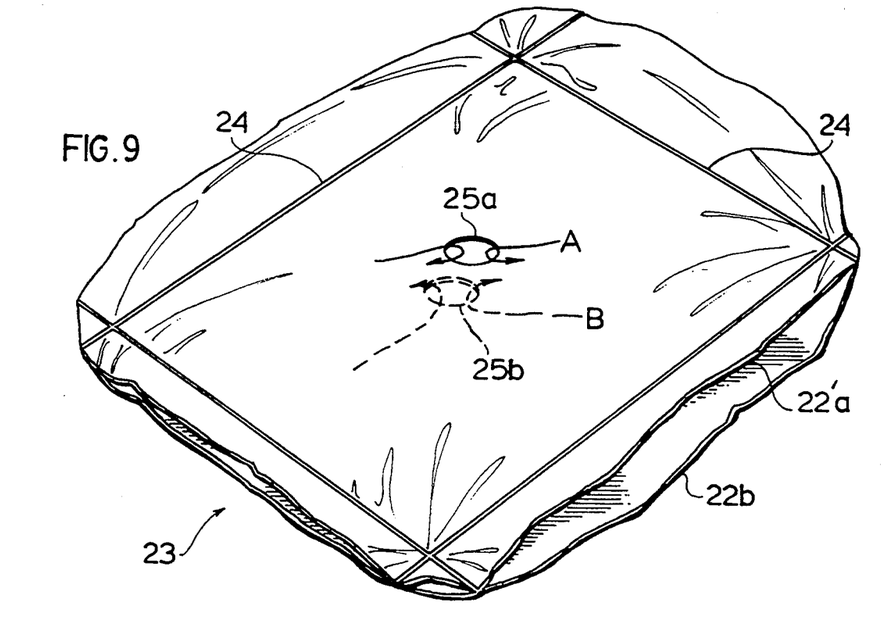
FIG. 9 is a top perspective view of a further double-film sorbent medium for use in the method of the invention.
Figure 10:
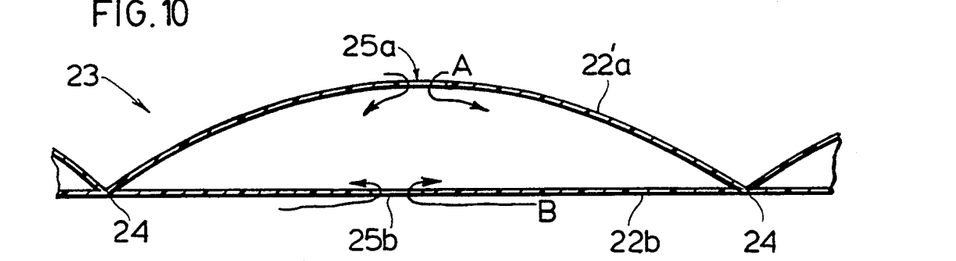
FIG. 10 is a cross-sectional view of the sorbent medium of FIG. 9.

As illustrated in FIGS. 9 and 10, a further modification to the sorbent media $D_1$ or $D_2$ which has been seen to improve the oil-pick-up ratio is achieved by forming the pockets 23 between the sealing seams 24 so that at least one of the two lateral film surfaces of each pocket is stretched or deformed away from the plane of the sorbent sheet so that it yields upon entry of oil into the pocket to form a "dome". In the perspective and sectional views of FIGS. 9 and 10, respectively, the dome-forming film is indicated as 22'a and the base-forming film as 22b. Where films 22'a and 22b are made of a polyolefin polymer having a density less than that of water, oil will tend to enter the pockets through offset central apertures 25a and 25b like those of the embodiment of FIGS. 4 to 8 and spread along the interior film surfaces, as illustrated by arrows A and B.

The dome-forming film 22'a can be made, for example, by creasing one film prior to joining the two films together along sealing seams. Specimens $D_3$ and $D_4$ are double-film layer sorbents of the same polyethylene material as $D_1$ and $D_2$ but in each of $D_3$ and $D_4$ one of the two component films was creased before fusing the films along seam lines into pockets. $D_3$ and $D_4$ differ from each other in that the apertures through the pocket faces are a plurality of small slits for $D_3$ and a central pair of offset holes in the case of $D_4$. The average oil pick-up ratio for $D_3$ and $D_4$ were seen to be 32.7 and 35.6, respectively.

Comparison of specimen $D_2$ and the "doming" specimens $D_4$ with specimens $S_0$ to $S_3$ indicates that the use of a double layer of film with suitable formation of pockets and apertures gives rise to an oil retention which is more than double that of the single layer films of like materials.

The "related oil thickness" for the single film embodiments tested ranges from about 0.05 to 0.09 mm and for the double film from about 0.1 to about 0.8 mm, still much less than the 2.23 mm of the 3M Type 151 sorbent, but affording a useful and economical substrate for dealing with heavier oil films, particularly on shoreline waters where greater physical rigidity of sorbents is required.

The importance of a high value of "pick-up density", $m_0/V_s$ was referred to above in connection with the last column of Table I. In separate experimental measurements, not recorded in Table I, the pick-up density of a "D"-type sorbent medium according to the invention was compared to 3M Type 151 sorbent pads. Specimen $D_7$ consisted of a pair of films of NOVAPOL TM TF-Y 826-BP polyethylene resin, a hexene copolymer linear low density polyethylene (hexene copolymer LLDPE). Each film of specimen $D_7$ was of a thickness of about 0.01 mm (10 microns) in an $8\frac{1}{2}" \times 12"$ pocket heat-sealed along the four edges. Forty pierce holes were evenly distributed over the pocket, leaving 2" unpierced at each end to hold oil received within the pocket when it was lifted from the oil at the end of the test.

The sorbent specimens tested were laid flat on diesel oil in a tray. At regular intervals, specimens were removed and the values of the pick-up ratio $m_0/m_s$ and the pick-up density $m_0/V_s$ were determined in the manner indicated earlier, based on a product density of 0.65 g/cm$_3$ for a product roll of $D_7$ and a product density of 0.06 g/cm$^3$ for the 3M type 151 sorbent pad.

The 3M Type 151 specimen exhibited values for $m_0/m_s$ and $m_0/V_s$ of 18.1 and 1.14, respectively, after 15 min. exposure to oil. Longer exposures, up to 12 hours, showed no significant increase in pick-up ratio or pick-up density. The porous sorbent pad of 3M Type 151 then became fully saturated with oil with 15 minutes of immersion. By contrast, specimens of $D_7$ were well observed to dilute and fill with oil over the course of time, with measurements of $m_0/V_s$ set out in Table II.

TABLE II

| Time | $m_0/m_s$ | $m_0/V_s$ |
|---|---|---|
| 15 m | 85 | 55 |
| 30 m | 90 | 58 |
| 1 hr | 105 | 68 |
| 2 hr | 140 | 91 |
| 4 hr | 160 | 104 |
| 6 hr | 189 | 122 |
| 12 hr | 222 | 144 |

Even after only 15 minutes of emersion, the pick-up density of specimen $D_7$ was determined to exceed that of the pad sorbent and by two hours was about 80 times as great.

This large difference between the two sorbent media in the amounts picked up and retained per unit dry volume of sorbent is a consequence of an underlying principle of operation of "D"-type sorbent. Using a sorbent which has a dilatable configuration and a specific affinity for the liquid to be sorbed, so that the liquid itself acts to expand the capacity within the sorbent for liquid. Products such as the 3M absorbent pads have a volume which remains essentially the same before and after sorption, so that the pick-up density is limited and does not adjust itself to varying thicknesses of oil spill.

A further method of preparing sheet-like sorbent materials according to the invention is to form a "cellular" material of two oleophilic and hydrophobic films and provide central apertures through opposite faces of each cell, to admit and capture oil.

Air-cellular cushioning material such as Induspak CELLUL AIR TM and Sealed Air of Canada Ltd. POLYCAP TM bubble sheets are typically made of flexible plastics which possess the oleophilic and hydrophobic characteristics.

Figure 11:
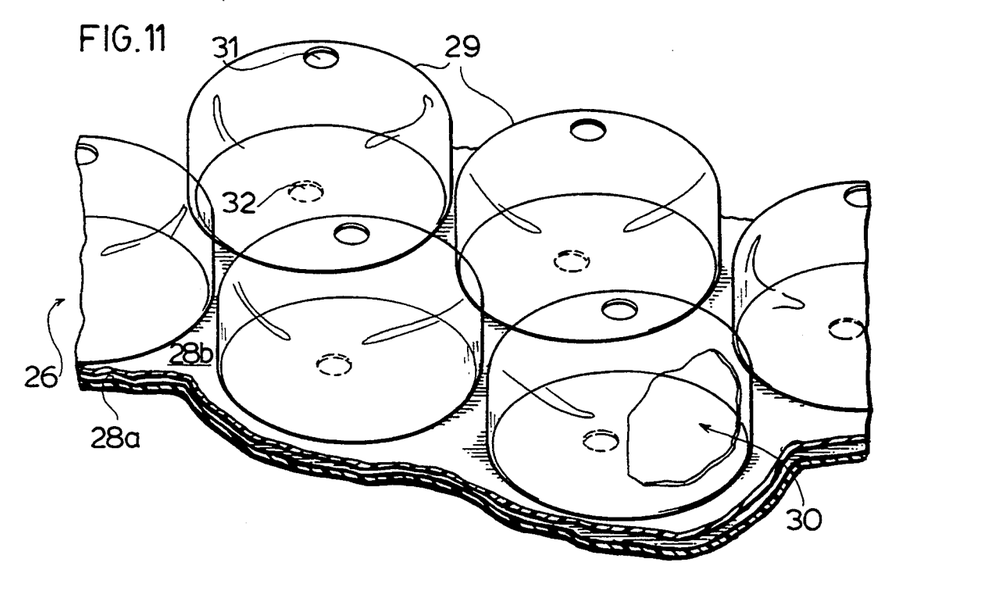
FIG. 11 is a perspective view of a portion of a sheet of sorbent material having a different configuration from that of FIGS. 4 and 9, which is also adapted for use in carrying out the method of the invention.

Referring back to Table I, specimens $D_5$ and $D_6$ were samples of the CELLUL AIR material having $1\frac{1}{8}"$ and $\frac{3}{8}"$ diameter bubbles, respectively, which were centrally pierced through each bubble and its subtending backing film. FIG. 11 illustrates in perspective view a portion of material 26 of the kind exemplified by specimens $D_5$ or $D_6$, comprising a flat film layer 28a discontinuously sealed to an embossed film layer 28b presenting a number of unsealed embossed portions 29 and associated cavity-forming regions 30. Central holes 31 and 32 are provided through the top surface of embossed portion 28b and the underlying portion of film layer 28a, respectively.

When these materials were placed in oil in the course of the above-described experimental testing, it was observed that oil tended to enter and restore the shape of the pierced bubbles even when these were physically collapsed prior to placement of the specimen in oil. Sheets of such materials, preparatory to use, can therefore be stored in rolls or in other compact configurations with the bubbles partially or nearly completely collapsed, so that a high storage density relative to conventional fibre mat sorbents is still achieved.

Smaller values of $A_s/m_s$ for these materials compared with specimens $D_1$ to $D_4$ is reflective of the greater film thickness and areal density of the plastic used in the air-cellular cushioning material which is intended to impart impact resistance in their ordinary use. Specifically, the bubble-form film of specimen $D_5$ was of thickness 0.02 mm and the backing (unembossed) film was of thickness 0.045 mm. For a given area of sorbent material, the weight of $D_5$ is about 13 times that of $S_3$, but the "related oil thickness" is 42 times as great. Thus for thicker oil films the "cellular" sorbent medium is to be preferred. Fabrication of such materials with thinner film than used in commercial bubble sheet packing would be expected to lower the weight per unit of substrate without substantially lowering its oil pick-up capacity.

As seen from Table I, the "related oil thickness" of Specimen $D_5$, 3.67 mm, is comparable to that of the 3M Type 156 sorbent and corresponds to the thickness of oil on water very near to the source of a substantial spill or from a tanker or floating oil rig. Taken with the higher storage density of such material compared to bulky fibre-sheets or rolls, rolls of the double-film sorbent substrates having pierced cells therein, are particularly adapted for storage on potential sources of oil spills, from which they could immediately be deployed about or onto spilling oil in the event of a mishap pending arrival or setting up of conventional boom containment arrangements, to serve as a useful first line of defence near or at the source of the oil spill.

(b) Preferred Embodiments of The Method

Figure 3:
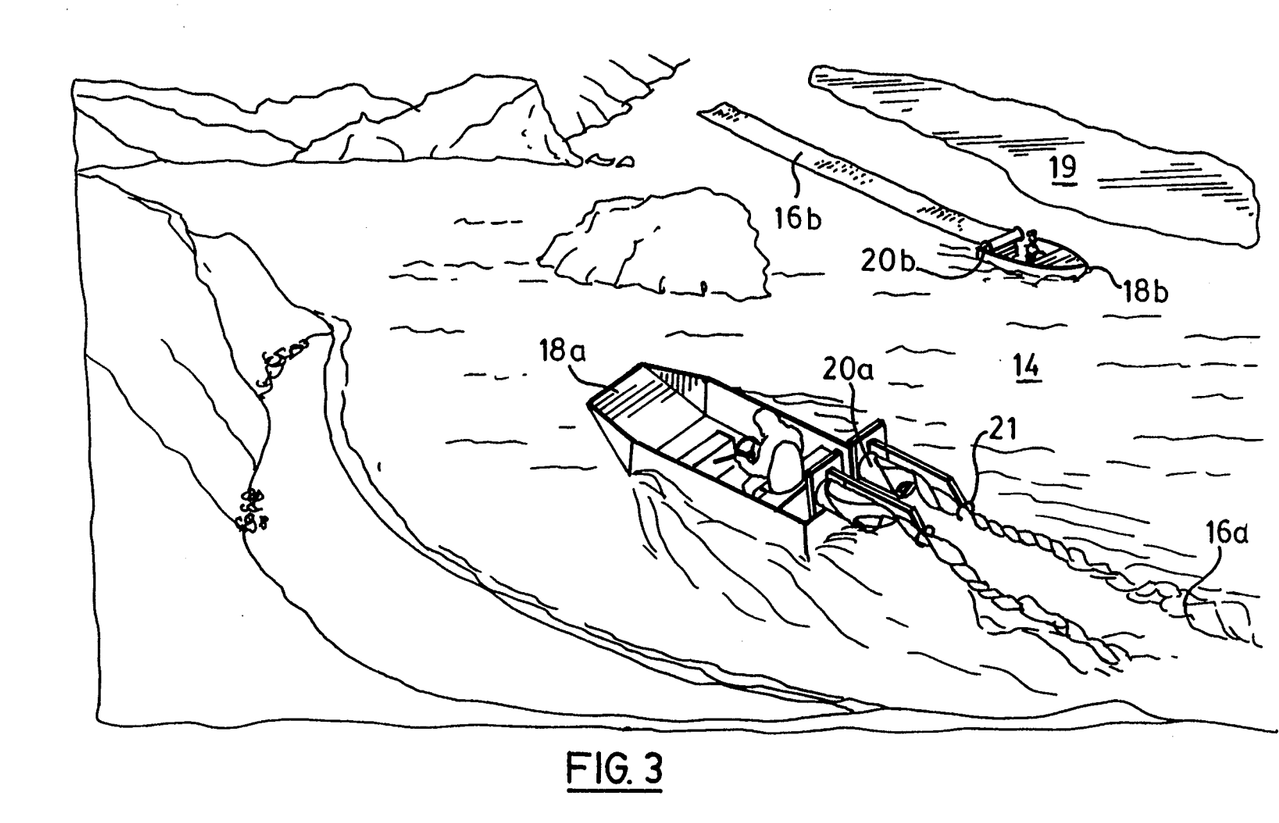
FIG. 3 is a schematic drawing illustrating the use of apparatus according to two preferred embodiments of the invention in the deployment of a film-based sorbent from a roll dispenser on a small boat to protect a sensitive area threatened by an approaching oil slick.

FIG. 3 illustrates, in schematic fashion, the deployment in a sheltered cove 14 of film-form sorbent material by a small two-man boat 18a or 18b. The sorbent 16 can be stored on and played off a roll dispenser 20a or 20b between the area to be protected and a spreading oil spill 19.

Figure 3A:
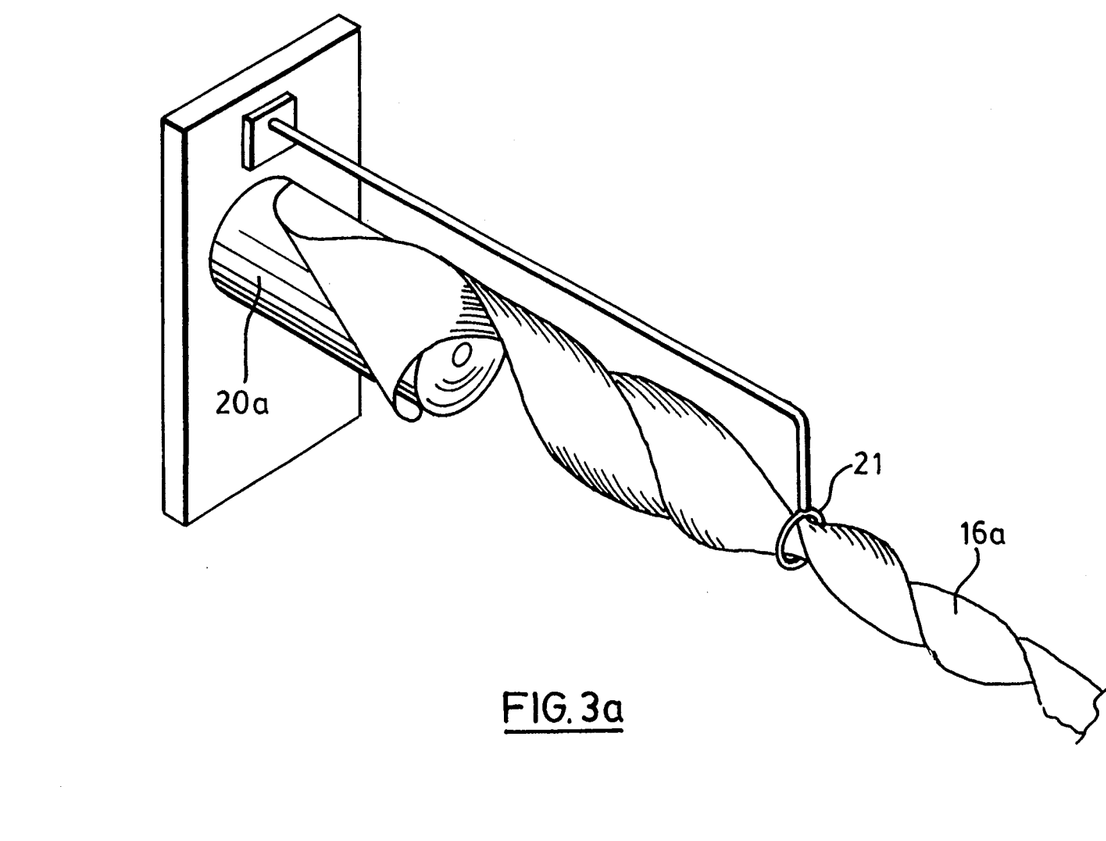
FIG. 3a is a schematic drawing illustrating the formation of a generally helical barrier belt by a film-based sorbent being deployed in the axial direction from a roll dispenser as in one of the embodiments of the method of the invention illustrated in FIG. 3.

In the drawings and in the following discussion, the reference numerals including the letter "a" refer to the method in which the sorbent 16a stored on roll dispensers 20a is pulled off one or more rolls 20a in an "axial" direction, i.e., in a direction parallel to the axis of the roll. Reference numerals including the letter "b" refer to the method in which the sorbent 16b stored on a roll dispenser 20b is pulled off the roll 20b in a "tangential" direction, i.e., perpendicularly to the axis of the roll and tangentially to the circumference thereof.

As seen in FIGS. 3 and 3a, the axial deployment of sorbent 16a from one or more roll dispensers 20a results in the formation of a generally helical belt(s) of sorbent 16a, a desired length of which is deployed between the area to be protected and the advancing oil spill, or else entirely around an oil spill to serve as a barrier against spreading of the oil. Associated with each roll 20a is a fixed guide loop 21 coaxial with the roller axis, to ensure smooth formation of a helical belt at the minimal tension from sorbent pulled off the roll and through guide loop 21.

The low weight per unit length of film-based sorbents used in the present invention, combined with a relatively high tensile strength and low surface friction, lend these materials to ready deployment in a wide range of environmental circumstances. In a test carried out to assess the efficiency of axial deployment at high speeds and low tension of film-based sorbents, a roll of 2,000' (600 m) of double-film, pocketed sorbent substrate of a width of 10.5" (27 cm) and a thickness under 1/1000" (0.025 mm) prior to deployment was mechanically pulled off the roll.

Measurements on a "D" type sorbent (two layer polyethylene film with rectangular pockets and pierced apertures through the films) showed an axial horizontal deployment speed of 34 mph (55 km/hr) initiated at a tension of only ½ oz. (14 g). The deployment created a near-round, hollow, bulky barrier in the form of a generally helical belt. Artificial sudden starts and stops to the pulling off process produced no breaks or "overruns" indicating that the material was suitable for speedy deployment by fast carriers or craft, along shore or at sea.

The oil affinity of a helical belt of this D-type sorbent was measured by forming a closed 46 cm long loop of the material, which was floated on water in a test tray and adding 60 g (approximately 66 cm$^3$) of crude oil to the surface of the water inside the loop. After about twelve minutes, substantially all of the oil had migrated from the area bounded by the loop to the interior of the helical belt, where it was retained. The 2 gram weight of sorbent deployed in this test was calculated to occupy a pre-deployment volume of only 2.2 cm$^3$ on the roll of sorbent from which it was pulled off, so that the pickup density for this material was approximately 30 g/cm$^3$ [$m_0/V_s$=60 g/2.2 cm$^3$].

Moreover, the increase in cross-sectional area which results in forming the sorbent material into a "contoured" post-deployment condition (in the present embodiment, a generally helical belt) results in a continuing barrier action even after saturation of the belt with oil. To the aforementioned closed loop of the D-type sorbent material an additional 90 g of crude oil was poured into the center of the area bounded by the oil-saturated loop of helically contoured sorbent and the additional oil was effectively confined and contained within that area, showing no spreading outside the loop for at least ten minutes.

The aforementioned high storage density (25,000 sq. ft. per "standard" roll) of film-form sorbents also makes it a practical application for a supply of such material to be stored on oil tankers, floating oil rigs or other potential sources of oil spillage on open water, in association with suitable means for compactly storing and rapidly deploying lengths of the sorbent about or onto the spilling oil to reduce spreading at and near the source, i.e. for preliminary assistance in containment until a conventional boom-type containment system can be put in place.

Alternatively, rows of film-form sorbent could according to the invention be dispensed from suitable payout means installed on a helicopter positioned over forming oil slicks, near such sources of spillage as floating oil rigs, and laid down from above the spill source.

It will be appreciated by those of ordinary skill in the art that any of a number of thin sheet-like sorbent materials having oleophilic and hydrophobic properties could be used to take advantage of the large value of $m_0/m_s$ characterizing such materials. Examples $S_1$ to $S_3$ relate to films of oleophilic polymers such as polyethylene having a density less than that of water, to float on the surface of the oil-contaminated water. Other potential variations and their applications contemplated are as follows:

Paper treated on one side to have an oleophilic and hydrophobic upper surface could be used as a sorption substrate by application, for example, to a beach surface threatened with an approaching oil spill, with its oleophilic, hydrophobic surface facing upwardly and the hydrophillic paper surface at the bottom. The paper will then tend to absorb water in use when the substrate is exposed to oil-contaminated water washing onto shore, and the added weight of the substrate by absorption of water will tend to hold the sorbent in place during adsorption of oil by the oleophilic upper surface.

A thin-film oleophilic sorbent medium for use with the apparatus and in carrying out the method of the invention could also include additive components such as detergents or components conducive to biodegradation of the spilled oil or, ultimately, of the substrate itself. Polyethylene or other polyolefin films could be used as a matrix for desired such additives.

It will also be understood by those of ordinary skill in the art that the method steps of the present invention of providing a compact supply of one of the film-based sorbent materials as aforesaid in a pre-deployment condition of high product density and of deploying a desired length of the sorbent material from that supply onto the area to be protected (thereby converting the pre-deployment density of the sorbent to an operating bulkiness and enhanced oil capacity) could be carried out by storing such sorbent materials in any of a number of conventional compact packaging techniques, e.g. fan-folding or planetary coiling, which lend themselves to low-tension (and hence high-speed) pay-out processes for delivery of the sorbent.

While the present invention has been described in some particularity as to embodiments specifically shown, other means for carrying out the method of the present invention will be appreciated by those of ordinary skill in the art and can be utilized without departing from the scope of the invention defined in the claims appended hereto.

The low weight per unit length of film-based sorbents used in the present invention, combined with a relatively high tensile strength and low surface friction lend these materials to ready deployment in a wide range of environmental circumstances. It was observed that for a 10½" wide 12" diameter roll of "D" type sorbent according to the invention that there was a resistance to the pulling off of film in the axial direction of the order of 20 g with the axis of the roll vertically oriented and of the order of 10 g with the axis of the roll horizontally oriented. Accordingly, any of a number of conventional packaging techniques may be used for storing the sorbent, e.g. fan-folding or planetary coiling, which lend themselves to low-tension (and hence high-speed) pay-out processes for delivery of the sorbent.

I claim:

1. A method for protecting shoreline water or land areas from approaching oil spills, comprising:

providing a supply of a thin flexible sheet sorbent material in the form of a roll, said sorbent material having a density less than water, and said supply containing said sorbent material in a pre-deployment condition of high density;

deploying an effective length of said sorbent material from said supply onto the area to be protected by unrolling a desired length of said sorbent material from the roll in a tangential direction and laying said length of sorbent material essentially flat onto the area to be protected;

removing the deployed sorbent material and oil retained thereby for disposal;

wherein said sorbent material comprises a pair of superposed thin, flexible films of a non-fibrous, oleophilic and hydrophobic material said pair of films being discontinuously sealed together along sealing seams, thereby forming a plurality of perimetrically sealed pockets between corresponding portions of each of said films, said corresponding portions of film forming each of said pockets presenting a pair of offset circular, generally central holes through respective opposed portions of said films whereby oil passes through said holes.

2. A method for protecting shoreline water or land areas from approaching oil spills, comprising:

providing a supply of a thin flexible sheet sorbent material in the form of a roll, said sorbent material having a density less than water, and said supply containing said sorbent material in a pre-deployment condition of high density;

deploying an effective length of said sorbent material from said supply onto the area to be protected by unrolling a desired length of said sorbent material from the roll in a tangential direction and laying said length of sorbent material essentially flat onto the area to be protected;

removing the deployed sorbent material and oil retained thereby for disposal;

wherein said sorbent material comprises a pair of superposed thin, flexible films of a non-fibrous, oleophilic and hydrophobic material having two principal surfaces, said pair of films being discontinuously sealed together, thereby forming a plurality of interior pockets and each film of said sorbent material having a plurality of apertures therethrough, such that when a length of said sorbent material, in use, contacts oil from the oil spill the oil passes through said apertures and migrate along corresponding portions of the principal surfaces of films inside each pocket, thereby admitting the entry of contaminating oil into said pockets.

3. A method according to claim 2, wherein said sorbent material includes a substance having oil-degrading properties, incorporated in the oleophilic and hydrophobic material of said film or contained within said pockets of the sorbent.

4. A method according to claim 2, wherein at least one of said flexible films has been stretched or deformed away from the horizontal plane so that it yields upon entry of contaminating oil between the surfaces of said films, thereby increasing the interior volume capacity of said pockets for oil.

5. A method according to claim 4, wherein said flexible films are composed essentially of an olefinic polymer and said formation of one of said films to increase pocket capacity is effected by creasing one of said films prior to discontinuously sealing films together, whereby said one film tends to form a convex dome on each pocket as oil enters the pocket.

6. A method according to claim 2, wherein said flexible films consist essentially of an olefinic polymer.

7. A method according to claim 6, wherein said olefinic polymer is polyethylene.

8. A method according to claim 7, wherein the thickness of said film is about 0.01 mm.

9. A method for protecting shoreline, water or land areas from approaching oil spills, comprising
providing a supply of a thin flexible sheet sorbent material having a density less than water and comprising a thin flexible, non-fibrous film of oleophilic, hydrophobic material having two principal surfaces, said supply of sorbent material being in the form of a roll having closely wound thereabout a continuous length of said sorbent material;
deploying said sorbent material by pulling said sorbent material from the roll in an axial direction, whereby the sorbent material forms a generally helical belt;
extending an effective length of said generally helical belt of deployed film between the area to be protected and the advancing oil spill;
contacting said helical belt of deployed film with the oil whereby said oil adheres to said principal surfaces of said film and then removing the deployed sorbent material and oil adhered thereto for disposal.

10. A method according to claim 9, wherein said sorbent material comprises a pair of superposed thin, flexible films of a non-fibrous, oleophilic and hydrophobic material, said pair of films being discontinuously sealed together, thereby forming a plurality of interior pockets and each film of said sorbent material having a plurality of apertures therethrough, such that when a length of said sorbent material, in use, contacts oil from the oil spill the oil passes through said apertures and migrate along corresponding portions of the principal surfaces of films inside each pocket, thereby admitting the entry of contaminating oil into said pockets.

11. A method according to claim 9, wherein said thin, flexible, non-fibrous film has a plurality of apertures therethrough to permit oil from the spill to pass from one principal surface of said sheet to the other.

12. A method according to claim 11, wherein said flexible film consists essentially of an oleophilic polymer.

13. A method according to claim 11, wherein said oleophilic polymer is polyethylene.

14. A method according to claim 13, wherein the thickness of said film is about 0.01 mm.

* * * * *